US006923509B1

(12) United States Patent
Barnett

(10) Patent No.: US 6,923,509 B1
(45) Date of Patent: Aug. 2, 2005

(54) CARGO TRAILER ANTI-TERRORIST AND ANTI-THEFT SYSTEM

(75) Inventor: Burton Barnett, Rossmoor, CA (US)

(73) Assignee: Cargo Safe, Inc., Sun Valley, CA (US)

(*) Notice: Subject to any disclaimer, the term of this patent is extended or adjusted under 35 U.S.C. 154(b) by 308 days.

(21) Appl. No.: 10/060,840

(22) Filed: Jan. 30, 2002

Related U.S. Application Data

(63) Continuation-in-part of application No. 09/466,655, filed on Dec. 20, 1999, now Pat. No. 6,402,261.

(51) Int. Cl.[7] .............................. F01B 7/00; B60T 17/16
(52) U.S. Cl. ...................... 303/89; 303/9.76; 188/170; 92/23
(58) Field of Search ........................... 303/89, 9.76, 71, 303/119.1, 119.2; 188/265, 170, 171, 173; 92/62–64, 92/23, 18

(56) References Cited

U.S. PATENT DOCUMENTS

| | | | | |
|---|---|---|---|---|
| 3,597,016 A | | 8/1971 | Gachot ........................ 303/89 |
| 3,735,834 A | * | 5/1973 | St. Onge .................... 180/289 |
| 3,826,176 A | | 7/1974 | Ike ................................. 92/25 |
| 3,880,477 A | * | 4/1975 | Stevenson et al. ............ 303/89 |
| 4,007,815 A | | 2/1977 | Acre .......................... 188/265 |
| 4,014,414 A | | 3/1977 | Yamamoto et al. ......... 188/170 |
| 4,014,579 A | | 3/1977 | Dubois .......................... 303/3 |
| 4,085,716 A | * | 4/1978 | Minami ...................... 123/699 |
| 4,192,557 A | * | 3/1980 | Leiber ...................... 303/114.3 |
| 4,268,093 A | | 5/1981 | Muller ......................... 303/89 |
| 4,273,388 A | | 6/1981 | Muller ......................... 303/89 |
| 4,354,536 A | | 10/1982 | Moss .......................... 141/383 |
| 4,589,704 A | | 5/1986 | Graham |
| H117 H | | 9/1986 | Graham |
| 4,621,874 A | * | 11/1986 | Gustafsson ................... 303/89 |
| 4,685,744 A | | 8/1987 | Luce ............................ 303/89 |
| 4,793,449 A | * | 12/1988 | Smith ......................... 188/107 |
| 4,793,661 A | * | 12/1988 | Munro ......................... 303/89 |

(Continued)

FOREIGN PATENT DOCUMENTS

FR 0891908 1/1999

(Continued)

OTHER PUBLICATIONS

Copy of article by Evelyn Nieves with Andrew Revkin in the New York Times Nov. 18, 2001 "Urgent Efforts to Prevent Theft of Trucks for Use as Bombs".*

Primary Examiner—Robert A. Siconolfi
Assistant Examiner—Melody M. Burch
(74) Attorney, Agent, or Firm—Gabor L. Szekeres

(57) ABSTRACT

A remotely activated electro mechanical device is mounted in the dual chamber brake system of a vehicle or trailer. The device includes a solenoid valve and a receiver decoder which controls the valve in response to a coded signal ideally available only to law enforcement to vent pressure in the emergency chamber of a dual chamber brake system to automatically apply the brakes thereby bringing a moving vehicle to a stop. The device is also responsive to a second, different coded signal, available only to authorized users to vent pressure in the emergency chamber and to lock the brakes by preventing pressurized air from being supplied to the dual chamber brake system of a stopped or parked vehicle. The device is also responsive to coded signals which reverse the above-noted actions.

27 Claims, 11 Drawing Sheets

U.S. PATENT DOCUMENTS

| | | | |
|---|---|---|---|
| RE32,885 E | 3/1989 | Graham | 303/9.76 |
| 4,873,824 A | 10/1989 | Cox | 60/545 |
| H748 H | 3/1990 | Graham | |
| 5,133,323 A * | 7/1992 | Treusch | 123/494 |
| 5,145,240 A * | 9/1992 | Harless et al. | 303/89 |
| 5,378,929 A * | 1/1995 | Mor et al. | 303/89 |
| 5,402,866 A | 4/1995 | Naedler et al. | 188/265 |
| 6,076,385 A | 6/2000 | Pedroso et al. | 70/257 |
| 6,322,161 B1 * | 11/2001 | Maslonka et al. | 303/89 |
| 6,367,888 B1 * | 4/2002 | Kee et al. | 303/89 |
| 6,402,261 B1 * | 6/2002 | Barnett | 303/89 |
| 2001/0050509 A1 * | 12/2001 | Holt | |
| 2002/0036428 A1 * | 3/2002 | Jacob | |
| 2002/0140282 A1 * | 10/2002 | Costa | |

FOREIGN PATENT DOCUMENTS

GB 2205620 12/1988

* cited by examiner

CARGO TRAILER ANTI-TERRORIST AND ANTI-THEFT SYSTEM

BACKGROUND OF THE INVENTION

CROSS-REFERENCE TO RELATED APPLICATION

The present application is a continuation-in-part of application Ser. No. 09/466,655 filed on Dec. 20, 1999 now U.S. Pat. No. 6,402,261.

FIELD OF THE INVENTION

The present invention is in the field of electromechanical devices designed to provide the means to intercept and terminate a terrorist's or renegade's use of cargo trailers (and like vehicles equipped with air brakes) for delivering explosive or hazardous materials to a potential target. A collateral benefit is its capability to deter theft of vehicles with air brakes. More particularly, the present invention is directed to a device or system that remotely locks the brakes of trailers, tractors, fuel tankers, and like vehicles (that are equipped with dual chamber air brakes) with a coded radio signal.

BRIEF DESCRIPTION OF THE PRIOR ART

Cargo-trailers, tractors, fuel tankers and like vehicles are capable of being used to deliver hazardous material for terrorist attacks on vulnerable targets. These vehicles may have been stolen or rented under false pretenses. In the case of trailers and like equipment that do not have their own motive power (engines), compressed air for operating the brake system is supplied through a conduit from the tractor or truck that pulls the trailer. Such trailers and the like towed equipment, as well as many tractors and trucks, are usually equipped with a dual chamber brake system that operates in such a manner that the brakes are automatically locked if pressurized air becomes unavailable. In order to take such a trailer without authorization, that is to steal it when it is parked, the thief typically mates a tractor to the trailer and supplies pressurized air to the dual chamber brake system of the trailer. In other words, by hooking up the thief's tractor's or truck's air pressure conduit to the brake system of the trailer, the thief is able to release the brakes and pull the trailer with the brakes operating normally. To this date and to the best knowledge of the present inventor, the state-of-the-art has attempted to prevent or discourage the theft of cargo-trailers by providing devices that make it difficult for an unauthorized person to access the trailer's hitch or "fifth wheel" or by providing a keyed cover ("glad hand" cover) that prevents attachment of a pressurized air conduit to the pressurized air inlet of the dual chamber air brake system of the trailer. Experience has shown however, that a determined thief circumvents these devices relatively easily.

Additional disclosures pertaining to brake systems, and to means for locking brake systems for various reasons and not necessarily for preventing theft are found in U.S. Pat. Nos. 3,597,016; 3,826,176; 4,007,815; 4,014,414; 4,014,579; 4,268,093; 4,273,388; 4,589,704; 4,685,744; 4,873,824; 5,402,866; Re. 32,885; Statutory Invention Registration Nos. H117 and H748. U.S. Pat. Nos. 4,354,536 and 6,076,385 include additional disclosures pertaining to some type of locking or latching mechanism.

Therefore, there is still a serious need in the art for a device or system that renders the dual chamber air brake system of a trailer (or of a tractor) non-operational for unauthorized users. The present invention provides such a system. In addition there is a serious need in the art for means that enables law enforcement and the like to remotely stop a renegade vehicle which is suspected of being loaded with hazardous material on route to a target. The present invention provides such means.

SUMMARY OF THE INVENTION

It is an object of the present invention to provide a secure and difficult to circumvent remote braking and/or brake locking device for trailers, tractors, or other vehicles equipped with dual chamber air brake systems, which can be initiated (and released) only by an authorized organization or individual.

It is another object of the invention to provide means for remotely stopping a trailer, tractor, or other vehicle equipped with dual chamber air brake system by using a coded signal which is available only to law enforcement agencies or authorized organizations or individuals.

It is still another object of the present invention to provide the locking device that meets the above-noted objective, and which operates within the interior of the dual chamber air brake system, thereby making it more difficult and time consuming to disassemble or inactivate the locking device and make unauthorized use of the trailer, tractor, or other vehicle equipped with the device less likely.

The foregoing and other objects and advantages are attained by a remotely activated device that has means mounted within the interior of the dual chamber brake system which, responsive to a coded signal, vents pressure in the emergency chamber of a dual chamber brake system to automatically apply the brakes thereby bringing a moving vehicle to a stop. This coded signal is ideally made available only to law enforcement agencies and the like. Upon receiving a different coded signal, usually available only to persons who are authorized users of the trailer or vehicle, the device also vents pressure in the emergency chamber and locks the brakes and blocks the brake actuator rod from being retracted into its non-braking operative position by preventing pressurized air from being supplied to the dual chamber brake system of a stopped or parked vehicle. The means for accomplishing these objectives is an electro mechanical device such as a solenoid valve which is remotely actuated by the above-noted coded signals that can only be transmitted by an authorized user or users. This solenoid valve is internally located, preferably at the air inlet port in the emergency chamber of the dual chamber brake system.

The features of the present invention can be best understood together with further objects and advantages by reference to the following description taken in connection with the accompanying drawings wherein like numerals indicate like parts.

DESCRIPTION OF THE PREFERRED EMBODIMENTS

Figure 1:
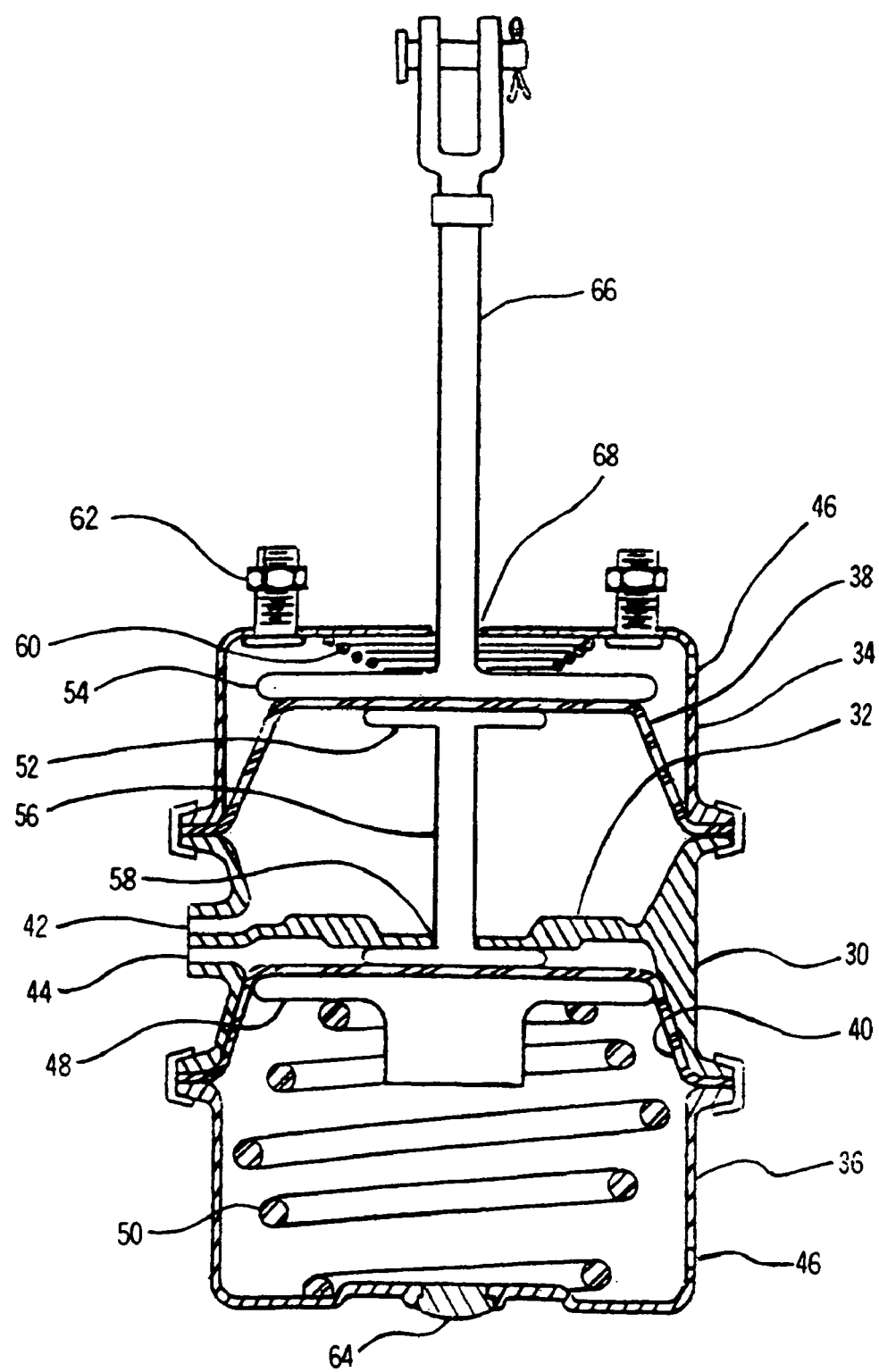
FIG. 1 is a sectional view of a typical dual chamber air brake system in accordance with the state-of-the-art, showing the air brakes in a locked position in a situation when pressurized air is not present in the system.

The following specification taken in conjunction with the drawings sets forth the preferred embodiment of the present invention. The embodiment of the invention disclosed herein is the best mode contemplated by the inventor for carrying out his invention in a commercial environment, although it should be understood that various modifications can be accomplished within the parameters of the present invention.

The present invention is best explained and understood in conjunction with a thorough understanding of the operation of the dual chamber air brake system that is constructed in accordance with the state-of-the-art. For this reason operation of the common state-of-the-art dual chamber air brake system is first explained with reference to FIGS. 1 through 4. The present invention is adapted to operate with such common dual chamber air brake system, with such modifications of the basic system that are required to incorporate into and integrate with it the security locking device of the invention.

Referring now to FIGS. 1 through 4, the state-of-the-art dual chamber brake system includes a housing 30 having two chambers with a common bulkhead 32. The first of the two chambers is the service housing chamber 34 and the second is the emergency housing chamber 36. Each of the two chambers 34 and 36 is divided into two parts by a flexible and stretchable diaphragm, termed the service diaphragm 38 and the emergency diaphragm 40, respectively. Each of the two chambers 34 and 36 has a separate inlet port for compressed air, that is, there is a service chamber pressure port 42 and an emergency chamber pressure port 44. A line, conduit or hose (not shown) conducting compressed air can be attached to each port 42 and 44, and is actually attached when the brakes are dynamically operated, that is when the trailer (not shown), truck (not shown), or other vehicle (not shown) having the dual chamber brake system is moved. In the event the vehicle is a trailer (not shown) without its own supply of compressed air then the conduits (not shown) attached to the ports 42 and 44 supply compressed air provided by the truck (not shown), or other towing vehicle (not shown) which pulls the trailer (not shown). In this connection it should be understood that the anti-theft feature of present invention is primarily intended for trailers because these are the most vulnerable for theft, but this feature of the present invention can also find application in any vehicle or equipment that has a dual chamber air brake system and which can be immobilized to prevent or hinder unauthorized removal. The "anti-terrorism" feature of the present invention, that is the feature that allows a moving vehicle to be remotely stopped by a coded signal, is considered equally useful and certainly equally applicable to trailers and to self-propelled vehicles as well.

Each of the two chambers 34 and 36 has a vent 46 that permits escape of air from the non-pressurized air space when the space behind the respective diaphragm 38 or 40 is pressurized with compressed air. The vented space in the emergency housing chamber 36 has a pressure plate 48 located between a high spring-rate (powerful) spring 50 and the diaphragm 40. A guide 52 links the movement of the pressure plate 48 in the emergency housing chamber 36 to the service diaphragm 38 in the service housing chamber 34 and to a push plate 54 that is located in the service housing chamber 34 between the service diaphragm 38 and the front wall of the service housing 34. The guide 52 includes a rod 56 that travels through an opening 58 in the common bulkhead. The rod 56 allows reciprocation of the guide 52 in the longitudinal direction relative to the two housings 34 and 36. A low spring-rate spring 60 is disposed between the push plate 54 and the front wall of the service housing 34. Two bolts 62 that attach the dual chamber brake system to the trailer (not shown), tractor (not shown), or other vehicle (not shown) are shown in the front of the housing 34, although more than two bolts may be used. A removable plug 64 is located in the back wall of the emergency housing chamber 36. The purpose of the removable plug 64 is to allow access with a special tool (not shown) into the interior of the emergency housing chamber 36. The low spring-rate spring 60 in the service housing 34 is significantly weaker than the high spring-rate spring 50 in the emergency housing 36. The push plate 54 is connected to a brake actuator rod 66 which passes through an opening 68 in the front wall of the service housing chamber 34. It will be readily understood by those skilled in the art that longitudinal movement of the brake actuator rod 66 "controls" the actual brakes of the wheels (not shown); forward movement applies them and rearward movement, that is retraction, releases them.

Figure 2:
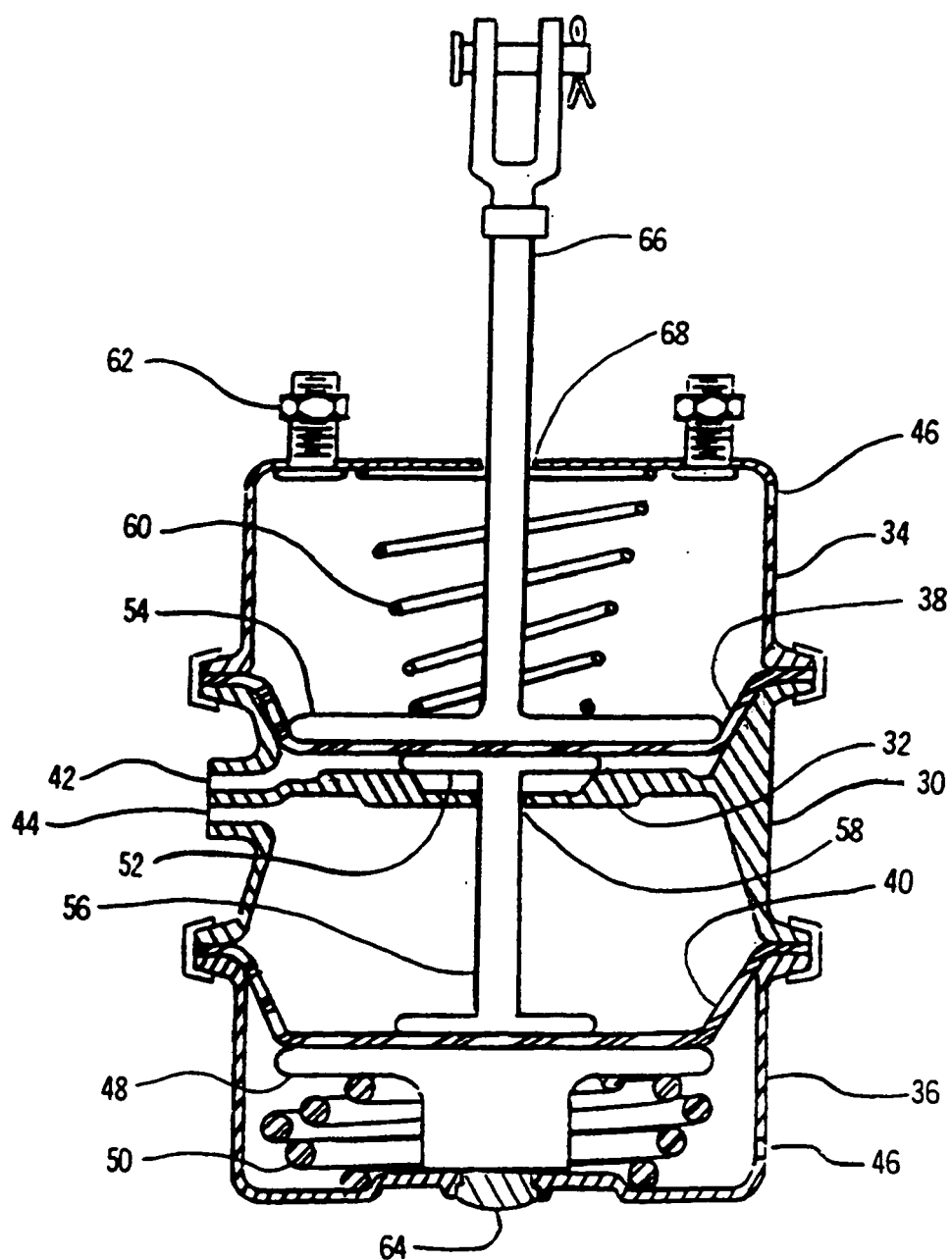
FIG. 2 is a sectional view of a typical dual chamber air brake system in accordance with the state-of-the-art, showing the air brakes in a situation when pressurized air is present in the emergency chamber and the brakes are not applied.
Figure 3:
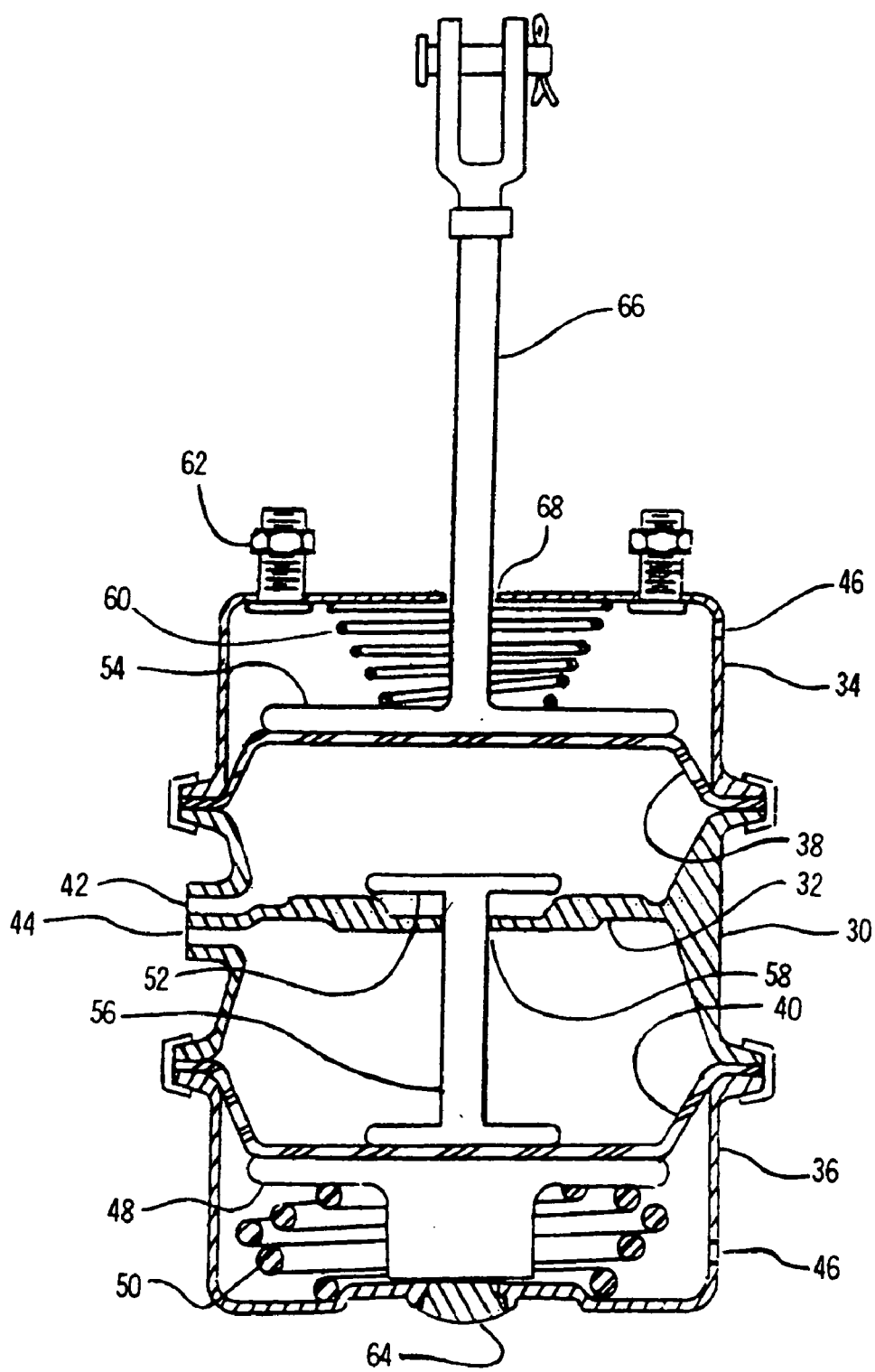
FIG. 3 is a sectional view of a typical dual chamber air brake system in accordance with the state-of-the-art, showing the air brakes in a situation when pressurized air is present in the emergency chamber and modulated in the service chamber to partially deploy the brakes.
Figure 4:
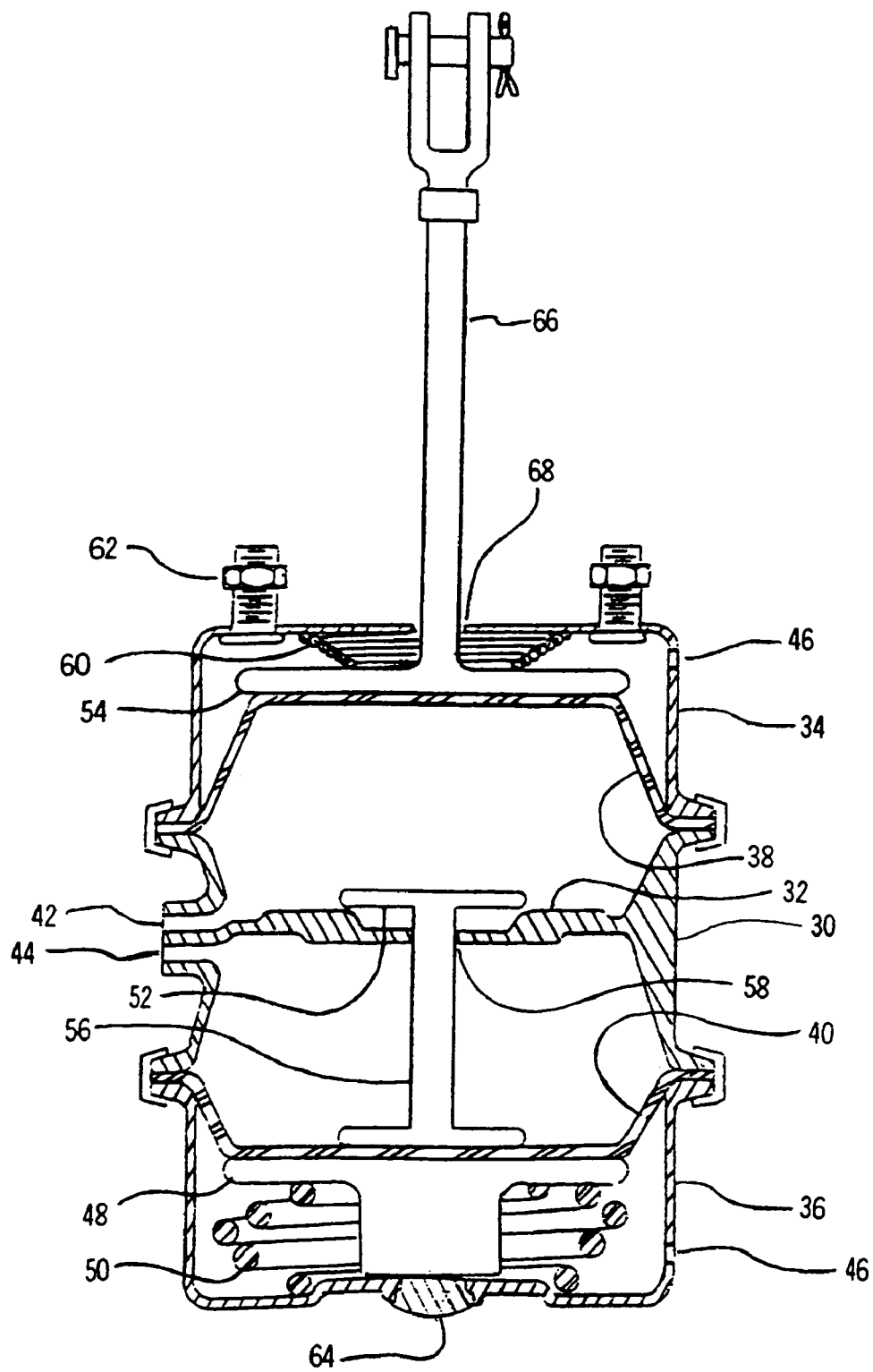
FIG. 4 is a sectional view of a typical dual chamber air brake system in accordance with the state-of-the-art, showing the air brakes in a situation when pressurized air is present in both the emergency and service chamber and the brakes are fully deployed.

FIG. 1 shows the state-of-the-art dual chamber brake system in a situation when compressed air is not provided to either chamber 34 or 36. This occurs usually when the trailer (not shown), truck (not shown), or other vehicle (not shown) is parked. In this situation the high spring-rate spring 50, overcoming the contrary force of the low spring rate spring 60 and compressing the same, pushes the guide 52 forward and thereby forces the push plate 54 and the brake actuator rod 66 forward, fully applying the actual wheel brakes (not shown). In such a situation the wheel brakes are locked and the trailer (not shown), tractor (not shown), or other vehicle (not shown) cannot be moved. However, when compressed air is supplied to the emergency chamber pressure port 44, as is shown in FIG. 2, then the high spring-rate spring 50 in the emergency housing chamber 36 is compressed and the low spring rate spring 60 causes the push plate 54 and the brake actuator rod 66 to retract thereby disengaging the wheel brakes (not shown). The trailer (not shown), tractor (not shown), or other vehicle (not shown) can now move normally. FIG. 3 shows the state-of-the-art dual chamber brake system with the brakes applied, as they would be when a driver (not shown) wishes to slow a moving vehicle (not shown). In this situation, due to application of the brake pedal (not shown) a measured pressure of compressed air is applied in the service housing chamber 34 through the service chamber pressure port 42, the service diaphragm 38 moves forward, the low spring-rate spring 60 is partially compressed, the brake actuator rod 66 is pushed forward by the push plate 54 and the wheel brakes are applied. FIG. 4 shows the situation when the brakes are applied fully by applying full pressure of compressed air in the service housing chamber 34. However, it can be seen that compressed air is still supplied to the emergency housing chamber 36, and the high spring-rate spring 50 is still compressed: the brakes are applied but not "locked" as they would be when the trailer (not shown) is parked without a supply of compressed air to the brakes.

FIGS. 5 through 11 illustrate the preferred embodiment of the anti-theft security device of the present invention mounted into an otherwise state-of-the-art dual chamber brake system. In this connection it will become apparent and should be understood that the dual chamber brake system is modified to the extent necessary to accommodate and cooperate with the anti-terrorist and anti-theft, brake-locking security device or system. Moreover, while the present specification discloses generic principles and a presently preferred embodiment, several other hardware configurations can be built in light of the present disclosure to restrain the brakes in the locked condition without departing from the spirit of the present invention. Therefore, it is not desired to confine the invention to any of the exact forms shown in this specification, but rather to include them as broadly as is the scope of the invention.

In accordance with invention, and in the herein described preferred embodiment, a solenoid valve 100 or the like electro-mechanical valving device is employed to control the flow of pressurized air into and out of the emergency housing chamber 36 to stop a moving vehicle equipped with dual chamber air brakes or to secure such a vehicle against unauthorized removal in a parked condition.

The solenoid valve 100 as a component in the apparatus of the present invention is responsive to electrical current (or lack of it) the flow of which is enabled by a receiver decoder 102 that is itself responsive to coded signals, such as electromagnetic or infra red signals akin to the signals that are virtually ubiquitously used in modern times for opening and locking car doors and the like by remote control. The coded signals may be sent by a hand-held "remote control" transmitter, schematically shown in the drawings as 69, that is ideally possessed only by law enforcement and by persons authorized to operate the trailer (not shown), truck (not shown), or other vehicle (not shown) or to stop its unauthorized operation. When the remote control transmitter is hand-held then it can be characterized as portable.

Alternatively, the coded signals may be supplied to the solenoid valve 100 or like electro mechanically actuated valving device from a transmitter built into the cab of the towing vehicle (not shown) or a hard wire connection (rather than by radiation) in certain of the applications. However, for the anti-terrorism feature of the invention whereby a moving vehicle can be stopped by law enforcement or the like using a coded signal, it is necessary for the receiver decoder 102 to be responsive to a signal originating from a remote source, which may or may not be hand held. Power to operate the solenoid valve 100 or like electromechanical valving device can be supplied by batteries in the trailer (not shown), truck (not shown), or other vehicle (not shown). In any event, the solenoid valve 100 or like electro mechanical valving devices and the receiver decoder 102 which are used as components of the apparatus of the present invention and which are responsive to a coded signal, are readily available in the state-of-the-art, and need not be described further. In the presently preferred embodiment the receiver decoder 102 is located in a different housing than the solenoid valve 100 or like electro mechanical valving device, and this configuration is shown in the drawing figures. However, it is possible to mount the solenoid valve 100 or like electro mechanical valving device and the receiver decoder 102 in the same housing, and such configuration or variations of these configurations are also within the scope of the invention.

Figure 5:
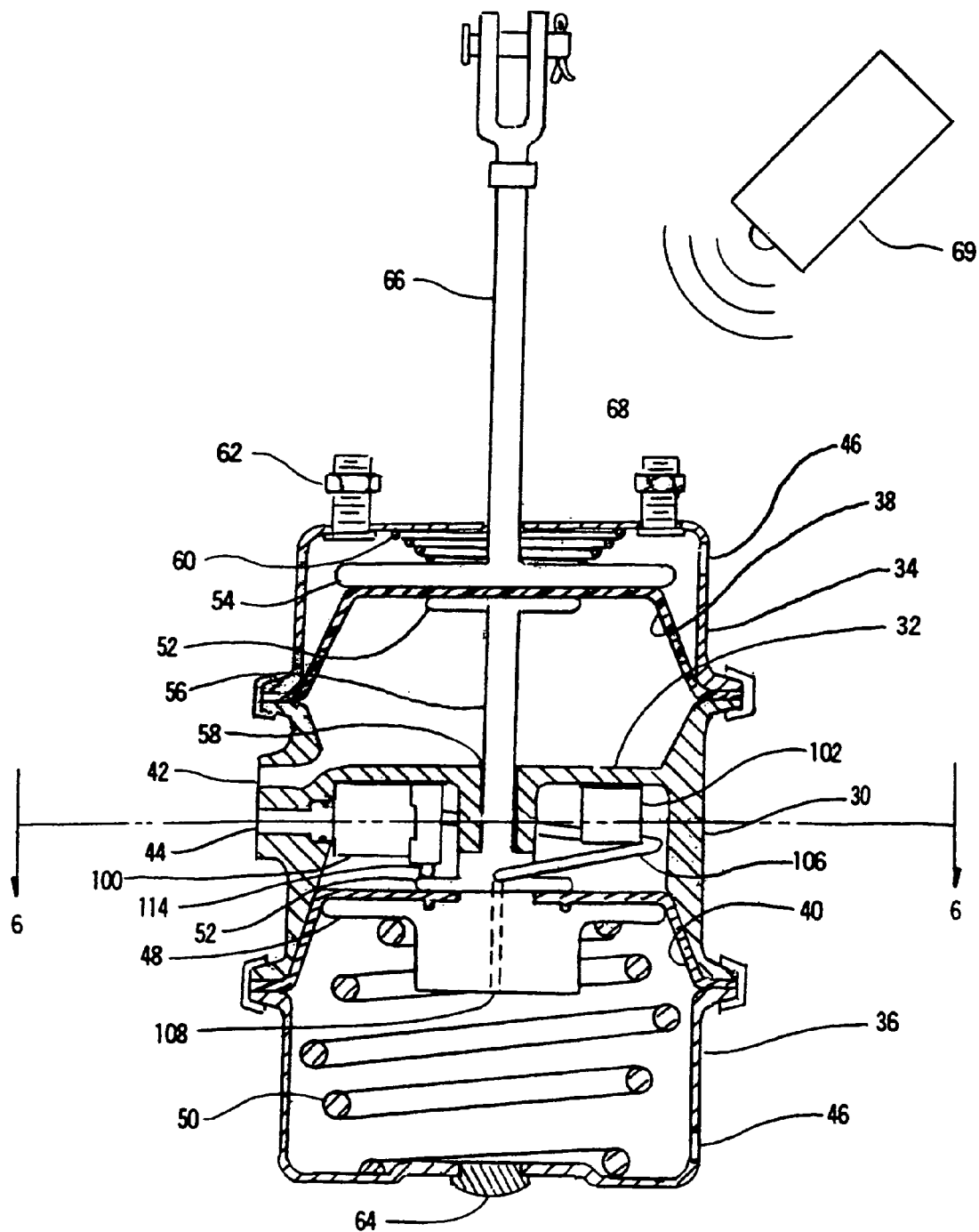
FIG. 5 is a sectional view of the service brake housing of a dual chamber brake system incorporating the preferred embodiment of the present invention showing the embodiment activated with the brakes in a locked position.
Figure 6:
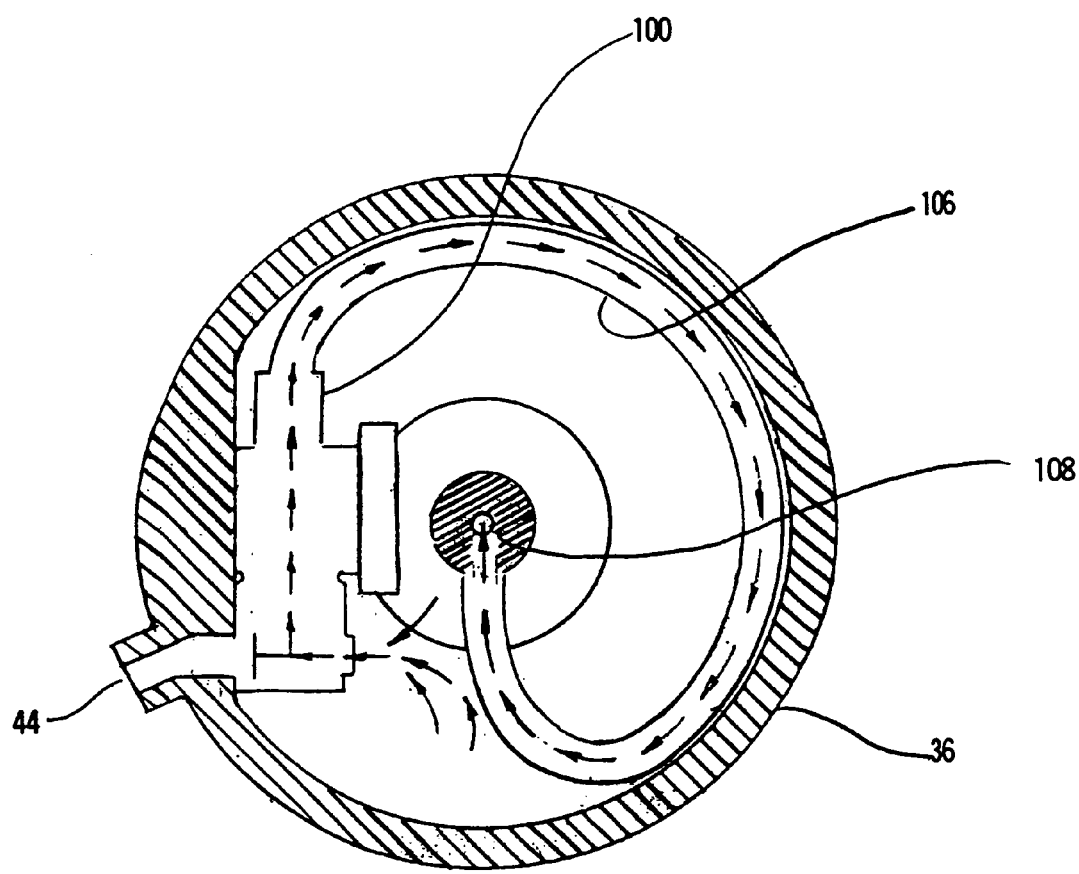
FIG. 6 is a cross-sectional view taken on lines 6.6 of FIG. 5.

In the first preferred embodiment, shown in FIGS. 5 and 6, the normally closed solenoid valve 100 with its coil de-energized vents air from the emergency housing chamber 36 through a flexible vent conduit 106 through a duct formed in the guide 52 and pressure plate 48 into the un-pressurized portion of the emergency housing chamber 36. The duct and its vent orifice emptying into the un-pressurized portion of the emergency housing chamber 36 bears the reference numeral 108. Air vented through the flexible vent conduit 106 and through the ducts 108 can escape into the environment through the vent 46 in the wall of the emergency housing chamber 36. In addition, in its closed, de-energized position the solenoid valve 100 blocks passage of air through the emergency chamber pressure port 44 and thereby prevents pressurized air from being re-supplied to the emergency housing chamber 36. When in this condition, the brakes are fully applied and the vehicle is stopped.

Figure 7:
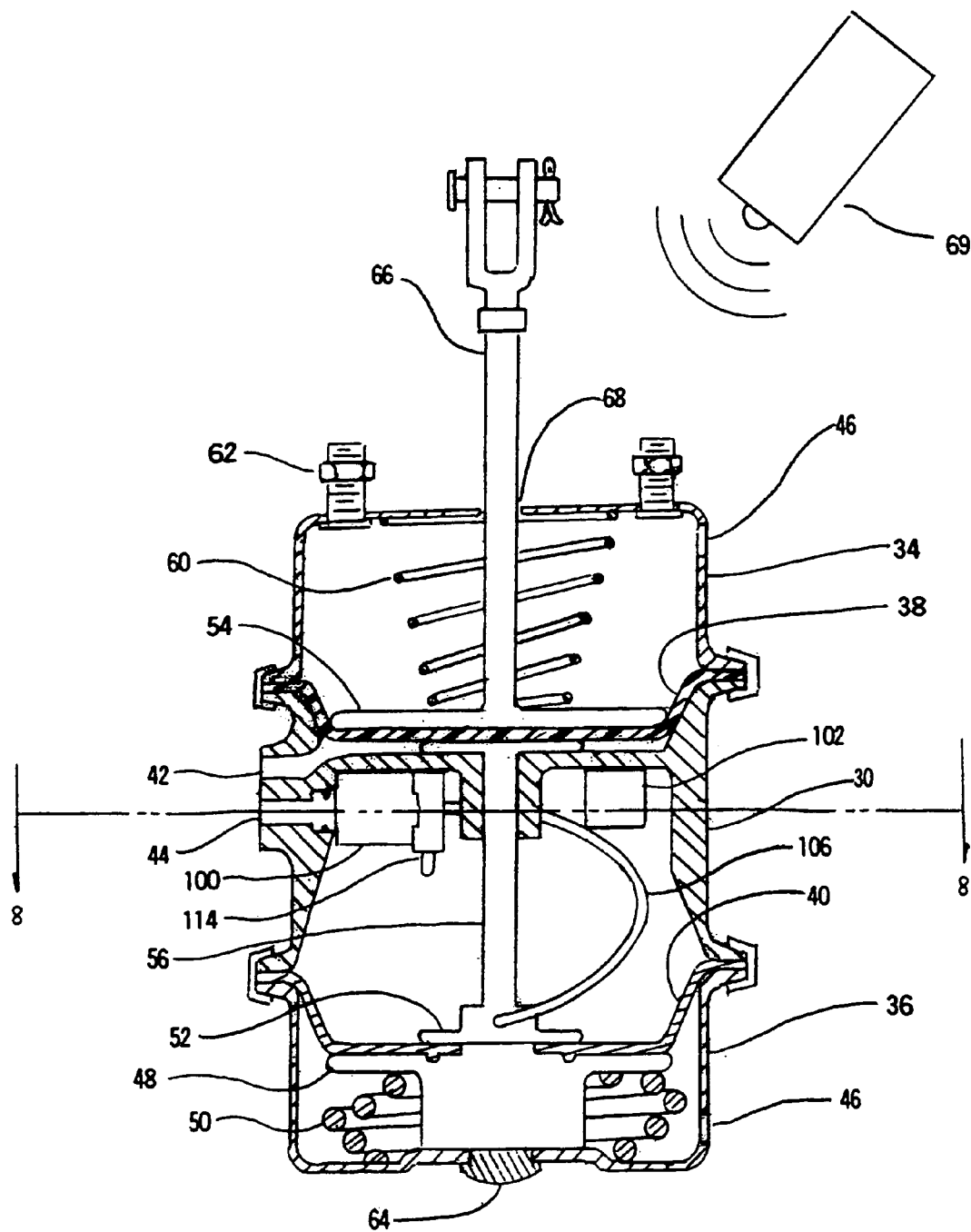
FIG. 7 is a sectional view of the service brake housing of a dual chamber brake system incorporating the preferred embodiment of the security locking device of the present invention showing the embodiment not activated, with pressurized air supplied to the emergency housing chamber but the brakes not deployed.
Figure 8:
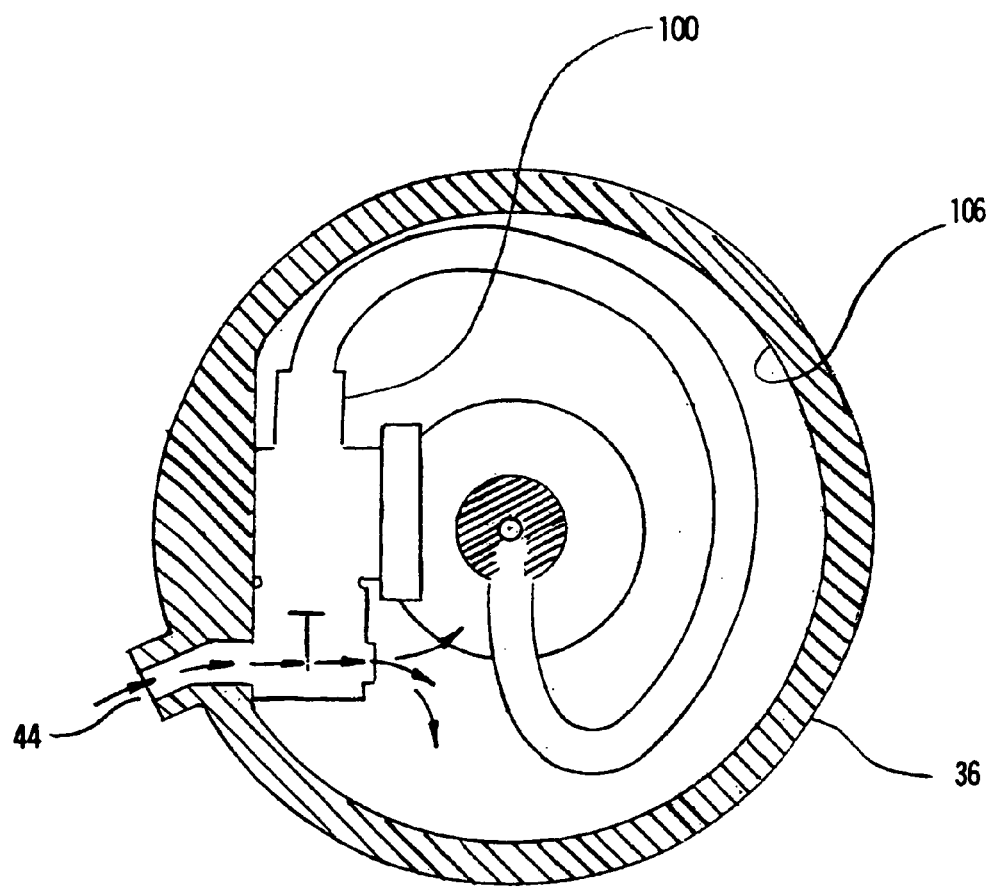
FIG. 8 is a cross-sectional view taken on lines 8.8 of FIG. 7.
Figure 9:
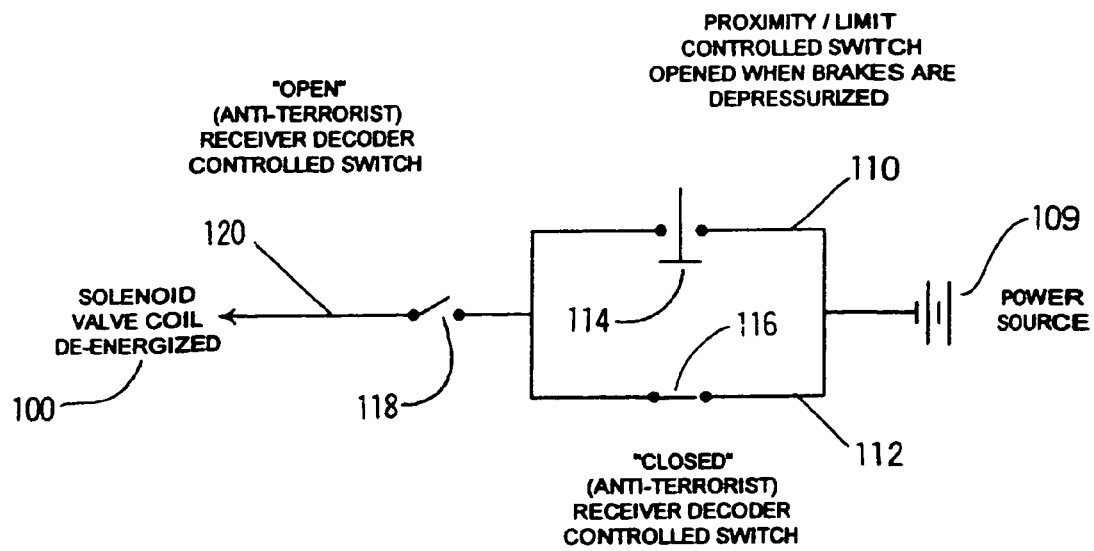
FIG. 9 is an electrical schematic of the preferred embodiment shown in FIG. 5 when a moving vehicle is brought to a halt by law enforcement action.
Figure 10:
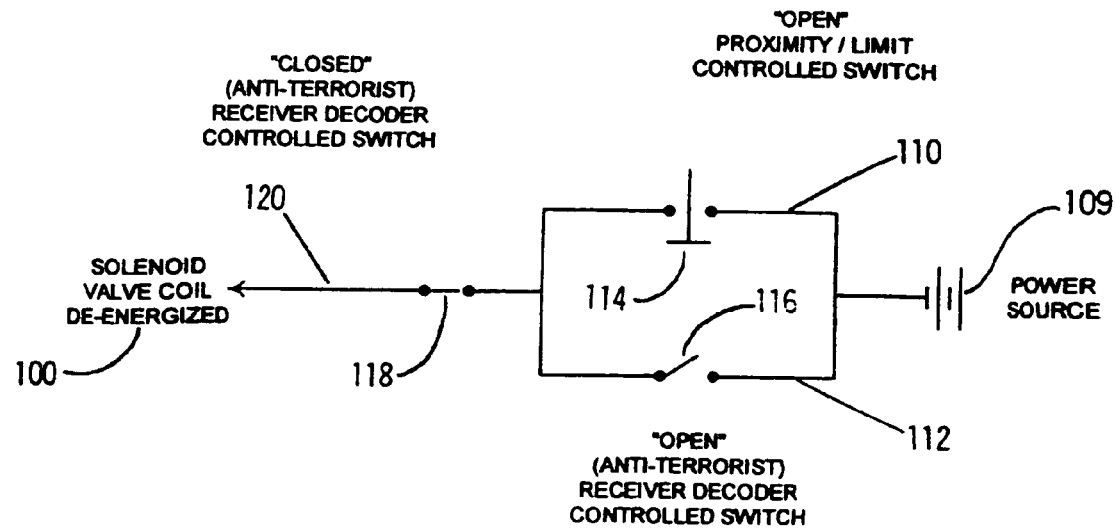
FIG. 10 is an electrical schematic of the preferred embodiment shown in FIG. 5 when a moving vehicle is parked and secured against theft by the authorized operator.
Figure 11:
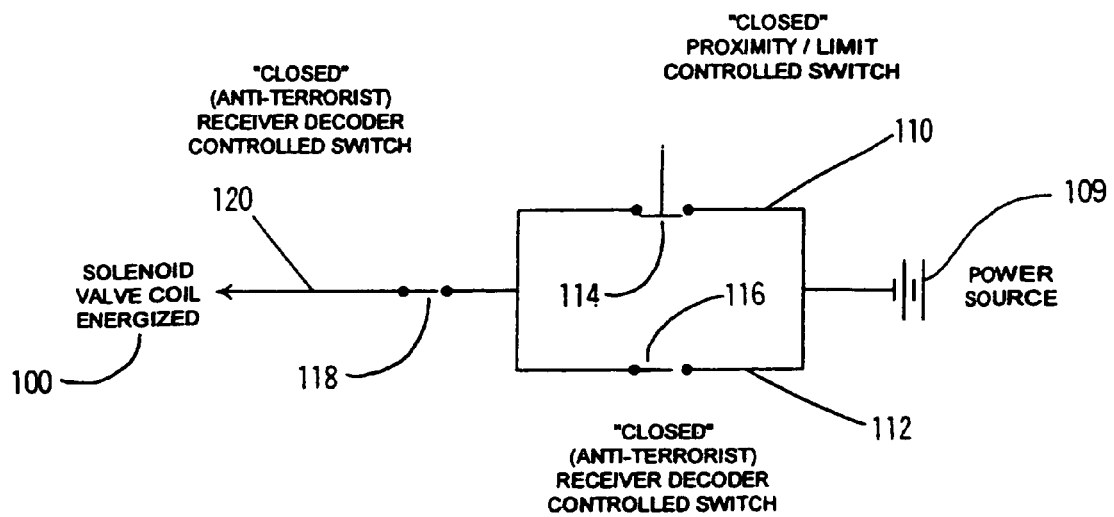
FIG. 11 is an electrical schematic of the preferred embodiment shown in FIG. 7 with the vehicle available for normal operation.

FIGS. 9, 10 and 11 depict an electrical circuit which in the herein described preferred embodiment controls the solenoid valve 100 and brings about its closed or open, that is de-energized or energized positions. As it can be seen in these three figures, the electrical circuit consists of two paths (110 with a proximity or limit switch 114, and 112 with a first switch 116) in parallel with each other and in series with a third path (120 with a second switch 118) connecting the power source 109 (battery) and the solenoid valve 100. The circuit itself is advantageously incorporated in the same housing which includes the receiver decoder 102, or it can be incorporated in the housing of the solenoid valve 100, or in a housing separate (not shown) from either of these devices, and other variations of these configurations are also possible within the scope of the invention. Two of the three switches, 116 and 118, of the circuit are opened and/or closed responsive to coded signals sent to and received by the receiver decoder 102. The third switch is a proximity or limit switch 114, also shown in FIGS. 5 and 7, that is normally closed unless opened by contact with the base of guide 52. The function and purpose of this proximity or limit switch 114 are explained below. With all three switches 114, 116, and 118 closed as shown in FIG. 11, the solenoid valve 100 is energized to admit pressurized air into the emergency housing chamber 36 compressing the high spring-rate spring 50 placing the brake system in normal operating condition. FIGS. 7 and 8 show the brake in this mode.

Referring now primarily to FIG. 9 the state of the circuit is shown when the trailer, tractor, or vehicle is stopped by emergency law enforcement or like action. The emergency law enforcement action may be initiated to stop a terrorist vehicle heading toward a restricted area, or a stolen or run-away vehicle refusing to stop when ordered, or such other circumstance that law enforcement deems appropriate. To bring about this status of the circuit and thereby activate the device of the invention in such situation (that is, to stop a moving vehicle), a unique coded signal (first signal or anti-terrorist signal) is transmitted to the receiver decoder 102 which then opens the second switch 118 and thereby the electrical circuit, regardless of the condition of switches 114 and 116, depriving the solenoid valve 100 of power. The unique coded signal is ideally available only to security and law enforcement agencies or organizations, in other words to persons or organizations who can be trusted and even relied on to stop a moving trailer or vehicle. As it is apparent from the foregoing description and inspection of FIGS. 5 and 6, de-energizing the solenoid valve 100 returns it to the normally closed condition, venting the air from the emergency housing chamber 36 and blocking entry of pressurized air through the emergency chamber pressure port 44 with the result that the brakes of the vehicle are applied fully and the vehicle is brought to an abrupt stop. Another unique coded signal (second signal) may be available to law enforcement to close the second switch 118 to enable the trailer, tractor, or other vehicle to move again, after the danger of terrorist action or like emergency has passed.

FIG. 5 shows the status of the brake system when parked, that is, the brakes fully applied and the emergency housing chamber 36 vented. In this parked condition the base of guide 52 is forced against the proximity or limit switch 114 by the expansion of the high spring-rate spring, thereby opening switch 114 and the electrical circuit in one of the parallel paths 110 as shown in FIG. 10. Thus when the vehicle is parked, and only when it is parked, the anti-theft feature of the invention can be activated by opening the electrical circuit in the second parallel path 112 to de-energize the solenoid valve 100 even if the second switch 118 in path 120 is closed. When de-energized, the solenoid valve is closed and pressurized air cannot be supplied to the emergency housing chamber 36. To accomplish this, the driver (not shown) or other authorized individual sends a coded signal (anti-theft or third signal) to the receiver decoder 102 to open the first switch 116 in path 112. This coded signal (anti-theft signal or third signal) is ideally available only to the owner of the trailer, tractor, or other vehicle equipped with the device of the present invention, or to persons authorized by the owner.

Still another coded signal, fourth signal (or "to go" signal) ideally available only to the driver or to persons authorized by the owner closes the first switch 116 thereby supplying power to the solenoid valve 100. The circuit in the "to go" operating state of the trailer, tractor, or vehicle is depicted in FIG. 11 and the operating mode of the dual purpose brake system is shown in FIGS. 7 and 8. In this condition the solenoid valve is energized, pressurized air is supplied through the emergency chamber pressure port 44 into the emergency housing chamber 36 to compress the high spring-rate spring 50 allowing the low spring-rate spring 60 in the service chamber 34 to expand and release the brake actuating rod 66 from the locked position and allow the braking system to respond to the driver's modulation of the brake pedal (not shown) for normal brake operation.

It can be seen from the FIG. 7 that when the trailer, tractor or vehicle equipped with the device of the present invention is in normal operating mode, the base of the guide 52 is not juxtaposed to the proximity or limit switch 114 and therefore the proximity or limit switch 114 remains closed. If in this condition of the device, a coded signal such as the anti-theft or third signal (or a signal akin to it which is perceived by the receiver decoder as the anti-theft, or third signal) was inadvertently or accidentally given, then the first switch 116 in path 112 would open, but the electrical circuit through the proximity or limit switch 114 in path 110 would still remain closed supplying power to the solenoid valve and thereby preventing unintentional locking of the brakes of the tractor, trailer, or vehicle while it is moving.

Those skilled in the art will readily understand that the above description teaches generic principles as well as discloses a presently preferred embodiment, and that several mechanical equivalents of the herein described device may become apparent to those skilled in the art in light of the present disclosure. Similarly, numerous electrical and electronic equivalents of the simple electrical circuit disclosed herein may become readily apparent to those skilled in the art in light of the present disclosure. Nevertheless such mechanical, electrical and electronic equivalents are intended to be within the scope of the present invention. Examples of such equivalent include the employment of a piston in place of the emergency chamber diaphragm, and many variations in other hardware, arrangement of the ports and vents. Other equivalents are using solenoid valves which are normally closed when power is supplied, requiring a rearrangement of the electric circuit, still well within the skill of the ordinary artisan in light of the present disclosure. Nevertheless, the embodiment disclosed herein is presently thought to be the preferred one to manufacture and provide the best security and compatibility with current dual chamber air brake systems in use on a multitude of trailers and vehicles to guard both against unauthorized use (theft) and to enable law enforcement to stop a moving vehicle when the circumstances render this necessary.

In one apparent alternative embodiment the electronic circuit may include only the second switch 118 (or an electric or electronic equivalent), and the receiver decoder 102 is responsive only to the first (anti-terrorist) coded signal to open the second switch 118 and thereby stop a moving vehicle, and to a second coded signal which would cause the second switch 118 to close. Ideally, these coded signals would be made available only to law enforcement or the like, thereby providing the trailer, tractor or vehicle equipped with a dual chamber brake system an this embodiment of the present invention only with the anti-terrorist feature of the invention.

What is claimed is:

1. An apparatus for locking and unlocking a brake actuator of a dual chamber brake system that operates brakes with compressed air, wherein the dual chamber includes the brake actuator in a first pressurizable chamber that serves as a service housing chamber and a high spring-rate spring in a second pressurizable chamber that serves as an emergency housing chamber, the brake actuator being movable in an axial direction to apply and release the brakes of the brake system; in the absence of compressed air the high spring-rate spring expanding to bias and keep the brake actuator in an axially forward position locking the brakes of the brake system, and wherein when there is compressed air in the second chamber the high spring-rate spring is compressed and allows retraction of the brake actuator from its forward position to unlock the brakes, the apparatus comprising:

electro mechanical means responsive to a first coded signal for venting pressurized air from the second chamber and for preventing entry of pressurized air into the second chamber whereby expansion of the high spring rate spring causes the brake actuator to move into the axially forward position locking the brakes of the brake system, the electromechanical means being mounted in one of the pressurizable service housing chamber and the pressurizable emergency housing chamber the electro mechanical means also being responsive to a second coded signal for allowing pressurized air to enter into the second chamber and for disallowing the venting of pressurized air from the second chamber thereby unlocking the brake actuator and unlocking the brakes, the second chamber further including an inlet port, said inlet port allowing attachment of a hose through which pressurized air is normally supplied to the second chamber, and the electro mechanical means further including a solenoid valve mounted in the second chamber to shut-off the supply of pressurized air through the inlet port in response to the first coded signal, and allow the supply of pressurized air through the inlet port in response to the second coded signal.

2. An apparatus in accordance with claim 1 wherein a conduit is included in the second chamber for venting pressurized air, said conduit being controlled by the solenoid valve, and wherein the solenoid valve allows the venting of pressurized air through the conduit in response to the first coded signal, and disallows the venting in response to the second coded signal.

3. An apparatus in accordance with claim 1 wherein the electro mechanical means include the solenoid valve and a receiver decoder, said receiver decoder being adapted for receiving the first and second coded signals and for controlling the solenoid valve in response to said signals.

4. An apparatus in accordance with claim 3 wherein the solenoid valve is controlled by the flow of electric current and wherein pressurized air is vented from the second chamber and entry of pressurized air into the second chamber is prevented in the absence of flow of current through the solenoid valve.

5. An apparatus in accordance with claim 4 wherein the current is supplied from a power source, a switch is interposed between the power source and the solenoid valve, and wherein the receiver decoder controls the switch in response to the first and second signals, respectively.

6. A dual chamber brake system that operates brakes with compressed air to be used in trailers and vehicles, the brake system including a brake actuator in a first pressurizable chamber that serves as a service housing chamber and a high spring-rate spring in a second pressurizable chamber that serves as an emergency housing chamber, the brake actuator being movable in an axial direction to apply and release the brakes of the brake system; in the absence of compressed air the high spring-rate spring expanding to bias and keep the brake actuator in an axially forward position locking the brakes of the brake system, the high spring-rate spring being compressed and allowing retraction of the brake actuator from its forward position so as to unlock the brakes when there is compressed air in the second chamber, the brake system further comprising:

electro mechanical means responsive to a first coded signal for venting pressurized air from the second chamber and for preventing entry of pressurized air into the second chamber whereby expansion of the high spring rate spring causes the brake actuator to move into the axially forward position locking the brakes of the brake system, the electromechanical means being mounted in one of the pressurizable service housing chamber and the pressurizable emergency housing chamber, the electro mechanical means also being responsive to a second coded signal for allowing pressurized air to enter into the second chamber and for disallowing the venting of pressurized air from the second chamber thereby unlocking the brake actuator and unlocking the brakes, the second chamber further including an inlet port, said inlet port allowing attachment of a hose through which pressurized air is normally supplied to the second chamber, and the electro mechanical means further including a solenoid valve mounted in the second chamber to shut-off the supply of pressurized air through the inlet port in response to the first coded signal, and allow the supply of pressurized air through the inlet port in response to the second coded signal.

7. A dual chamber brake system in accordance with claim 6 wherein a conduit is included in the second chamber for venting pressurized air, said conduit being controlled by the solenoid valve, and wherein the solenoid valve allows the venting of pressurized air through the conduit in response to the first coded signal, and disallows the venting in response to the second coded signal.

8. A dual chamber brake system in accordance with claim 6 wherein the electro mechanical means include the solenoid valve and a receiver decoder, said receiver decoder being adapted for receiving the first and second coded signals and for controlling the solenoid valve in response to said signals.

9. A dual chamber brake system in accordance with claim 8 wherein the solenoid valve is controlled by the flow of electric current and wherein pressurized air is vented from the second chamber and entry of pressurized air into the second chamber is prevented in the absence of flow of current through the solenoid valve.

10. A dual chamber brake system in accordance with claim 9 wherein the current is supplied from a power source, a switch is interposed between the power source and the solenoid valve, and wherein the receiver decoder controls the switch in response to the first and second signals, respectively.

11. An apparatus for locking and unlocking a brake actuator of a dual chamber brake system that operates brakes with compressed air, wherein the dual chamber includes the brake actuator in a first pressurizable chamber that serves as a service housing chamber and a high spring-rate spring in a second pressurizable chamber that serves as an emergency housing chamber, the brake actuator being movable in an axial direction to apply and release the brakes of the brake system; in the absence of compressed air the high spring-rate spring expanding to bias and keep the brake actuator in an axially forward position locking the brakes of the brake system, and wherein when there is compressed air in the second chamber the high spring-rate spring is compressed and allows retraction of the brake actuator from its forward position to unlock the brakes, the apparatus comprising: electro mechanical means, the electro mechanical means being mounted in one of the pressurizable service housing chamber and the pressurizable emergency housing chamber and being responsive to a first coded signal or to a third coded signal different from the first signal, for venting pressurized air from the second chamber and for preventing entry of pressurized air into the second chamber whereby expansion of the high spring-rate spring causes the brake actuator to move into the axially forward position locking the brakes of the brake system, the electro mechanical means also being responsive to a second coded signal or to a fourth coded signal for allowing pressurized air to enter into the second chamber and for disallowing the venting of pressurized air from the second chamber thereby unlocking the brake actuator and unlocking the brakes; wherein an inlet port is included in the second chamber, said inlet port allowing attachment of a hose through which pressurized air is normally supplied to the second chamber, and wherein the electro mechanical means include a solenoid valve mounted in the pressurizable second chamber to shut-off the supply of pressurized air through the inlet port in response to the first or to the third coded signal, and allow the supply of pressurized air through the inlet port in response to the second coded or to the fourth coded signal.

12. An apparatus in accordance with claim 11 wherein a conduit is included in the second chamber for venting pressurized air, said conduit being controlled by the solenoid valve, and wherein the solenoid valve allows the venting of pressurized air through the conduit in response to the first coded signal or in response to the third coded signal, and disallows the venting in response to the second coded signal or in response to the fourth coded signal.

13. An apparatus for locking and unlocking a brake actuator of a dual chamber brake system that operates brakes with compressed air, wherein the dual chamber includes the brake actuator in a first pressurizable chamber that serves as a service housing chamber and a high spring-rate spring in a second pressurizable chamber that serves as an emergency housing chamber; the brake actuator being movable in an axial direction to apply and release the brakes of the brake system; in the absence of compressed air the high spring-rate spring expanding to bias and keep the brake actuator in an axially forward position locking the brakes of the brake system, and wherein when there is compressed air in the second chamber the high spring-rate spring is compressed and allows retraction of the brake actuator from its forward position to unlock the brakes, the apparatus comprising: electro mechanical means, the electro mechanical means being mounted in one of the pressurizable service housing chamber and the pressurizable emergency housing chamber and being responsive to a first coded signal or to a third coded signal different from the first signal, for venting pressurized air from the second chamber and for preventing entry of pressurized air into the second chamber whereby expansion of the high spring-rate spring causes the brake actuator to move into the axially forward position locking the brakes of the brake system, the electro mechanical means also being responsive to a second coded signal or to a fourth coded signal for allowing pressurized air to enter into the second chamber and for disallowing the venting of pressurized air from the second chamber thereby unlocking the brake actuator and unlocking the brakes; wherein the electro mechanical means include a solenoid valve and a receiver decoder, said receiver decoder being mounted in one of the pressurizable first and second chambers and the receiver decoder being adapted for receiving the first, second, third, and fourth coded signals and for controlling the solenoid valve in response to said signals.

14. An apparatus in accordance with claim 13 wherein the solenoid valve is controlled by the flow of electric current and wherein pressurized air is vented from the second chamber and entry of pressurized air into the second chamber is prevented in the absence of flow of current through the solenoid valve.

15. An apparatus in accordance with claim 14 wherein the current is supplied from a power source, and wherein the apparatus further comprises switch and circuit means interposed between the power source and the solenoid valve and wherein the receiver decoder controls the switch and circuit means in response to the first, second, third and fourth signals, respectively, the switch and circuit means being adapted for
 (1) interrupting the flow of current in response to the first signal received by the receiver decoder;
 (2) interrupting the flow of current in response to the third signal received by the receiver decoder;
 (3) allowing the flow of current in response to the second signal, received by the receiver decoder, and
 (4) allowing the flow of current in response to the fourth signal received by the receiver decoder.

16. An apparatus in accordance with claim 15 wherein the switch and circuit means include three separate switches, one of said switches being a proximity switch controlled by the position of the brake actuator and staying in a closed position when pressurized air is present in the second chamber, the other two switches being controlled by the receiver decoder.

17. An apparatus in accordance with claim 16 wherein the switch and circuit means include
 (1) a conducting line between the solenoid valve and the power source, said conducting line including one of said switches controlled by the receiver decoder in response to the first and second coded signals, the proximity switch being in line with said switch controlled by the receiver decoder in response to the first and second coded signals,
 (2) the switch and circuit means further including a second conducting line in parallel with the proximity switch and in line with the switch controlled by the receiver decoder in response to the first and second coded signals, said second conducting line including the second of the three switches, said second switch being controlled by the receiver decoder in response to the third and fourth coded signals.

18. A dual chamber brake system for locking and unlocking a brake actuator of a dual chamber brake system that operates brakes with compressed air to be used in trailers and vehicles, the brake system including the brake actuator in a first pressurizable chamber that serves as a service housing chamber and a high spring-rate spring in a second pressurizable chamber that serves as an emergency housing chamber, the brake actuator being movable in an axial direction to apply and release the brakes of the brake system; in the absence of compressed air the high spring-rate spring expanding to bias and keep the brake actuator in an axially forward position locking the brakes of the brake system, and wherein when there is compressed air in the second chamber the high spring-rate spring is compressed and allows retraction of the brake actuator from its forward position to unlock the brakes, the dual chamber brake system further comprising: electro mechanical means, the electro mechanical means being mounted in one of the pressurizable service housing chamber and the pressurizable emergency housing chamber and being responsive to a first coded signal or to a third coded signal different from the first signal, for venting pressurized air from the second chamber and for preventing entry of pressurized air into the second chamber whereby expansion of the high spring-rate spring causes the brake actuator to move into the axially forward position locking the brakes of the brake system, the electro mechanical means also being responsive to a second coded signal or to a fourth coded signal for allowing pressurized air to enter into the second chamber and for disallowing the venting of pressurized air from the second chamber thereby unlocking the brake actuator and unlocking the brakes; wherein an inlet port is included in the second chamber, said inlet port allowing attachment of a hose through which pressurized air is normally supplied to the second chamber, and wherein the electro mechanical means include a solenoid valve mounted in the pressurizable second chamber to shut-off the supply of pressurized air through the inlet port in response to the first or to the third coded signal, and allow the supply of pressurized air through the inlet port in response to the second coded or to the fourth coded signal.

19. A dual chamber brake system in accordance with claim 18 wherein a conduit is included in the second chamber for venting pressurized air, said conduit being controlled by the solenoid valve, and wherein the solenoid valve allows the venting of pressurized air through the conduit in response to the first coded signal or in response to the third coded signal, and disallows the venting in response to the second coded signal or in response to the fourth coded signal.

20. A dual chamber brake system for locking and unlocking a brake actuator of a dual chamber brake system that operates brakes with compressed air to be used in trailers and vehicles, the brake system including the brake actuator in a first pressurizable chamber that serves as a service housing chamber and a high spring-rate spring in a second pressurizable chamber that serves as an emergency housing chamber, the brake actuator being movable in an axial direction to apply and release the brakes of the brake system; in the absence of compressed air the high spring-rate spring expanding to bias and keep the brake actuator in an axially forward position locking the brakes of the brake system, and wherein when there is compressed air in the second chamber the high spring-rate spring is compressed and allows retraction of the brake actuator from its forward position to unlock the brakes, the dual chamber brake system further comprising: electro mechanical means, the electro mechanical means being mounted in one of the pressurizable service housing chamber and the pressurizable emergency housing chamber and being responsive to a first coded signal or to a third coded signal different from the first signal, for venting pressurized air from the second chamber and for preventing entry of pressurized air into the second chamber whereby expansion of the high spring-rate spring causes the brake actuator to move into the axially forward position locking the brakes of the brake system, the electro mechanical means also being responsive to a second coded signal or to a fourth coded signal for allowing pressurized air to enter into the second chamber and for disallowing the venting of pressurized air from the second chamber thereby unlocking the brake actuator and unlocking the brakes; wherein the electro mechanical means include a solenoid valve and a receiver decoder, said receiver decoder being mounted in one of the pressurizable first and second chambers and the receiver decoder being adapted for receiving the first, second, third and fourth coded signals and for controlling the solenoid valve in response to said signals.

21. A dual chamber brake system in accordance with claim 20 wherein the solenoid valve is controlled by the flow of electric current and wherein pressurized air is vented from the second chamber and entry of pressurized air into the second chamber is prevented in the absence of flow of current through the solenoid valve.

22. A dual chamber brake system in accordance with claim 21 wherein the current is supplied from a power source, and wherein the apparatus further comprises switch and circuit means interposed between the power source and the solenoid valve and wherein the receiver decoder controls the switch and circuit means in response to the first, second, third and fourth signals, respectively, the switch and circuit means being adapted for:

(1) interrupting the flow of current in response to the first signal received by the receiver decoder;
(2) interrupting the flow of current in response to the third signal received by the receiver decoder;
(3) allowing the flow of current in response to the second signal, received by the receiver decoder, and
(4) allowing the flow of current in response to the fourth signal received by the receiver decoder.

23. A dual chamber brake system in accordance with claim 22 wherein the switch and circuit means include three separate switches, one of said switches being a proximity switch controlled by the position of the brake actuator and staying in a closed position when pressurized air is present in the second chamber, the other two switches being controlled by the receiver decoder.

24. A dual chamber brake system in accordance with claim 23 wherein the switch and circuit means include
(1) a conducting line between the solenoid valve and the power source, said conducting line including one of said switches controlled by the receiver decoder in response to the first and second coded signals, the proximity switch being in line with said switch controlled by the receiver decoder in response to the first and second coded signals,
(2) the switch and circuit means further including a second conducting line in parallel with the proximity switch and in line with the switch controlled by the receiver decoder in response to the first and second coded signals, said second conducting line including the second of the three switches, said second switch being controlled by the receiver decoder in response to the third and fourth coded signals.

25. An apparatus for locking and unlocking a brake actuator of a dual chamber brake system that operates brakes with compressed air, wherein the dual chamber includes the brake actuator in a first pressurizable chamber that serves as a service housing chamber and a high spring-rate spring in a second pressurizable chamber that serves as an emergency housing chamber, the brake actuator being movable in an axial direction to apply and release the brakes of the brake system; in the absence of compressed air the high spring-rate spring expanding to bias and keep the brake actuator in an axially forward position locking the brakes of the brake system, and wherein when there is compressed air in the second chamber the high spring-rate spring is compressed and allows retraction of the brake actuator from its forward position to unlock the brakes, the apparatus comprising:

electro mechanical means responsive to a first coded signal or to a third coded signal different from the first signal, for venting pressurized air from the second chamber and for preventing entry of pressurized air into the second chamber whereby expansion of the high spring rate spring causes the brake actuator to move into the axially forward position locking the brakes of the brake system, the electromechanical means being mounted in one of the pressurizable service housing chamber and the pressurizable emergency housing chamber and also being responsive to a second coded signal or to a fourth coded signal for allowing pressurized air to enter into the second chamber and for disallowing the venting of pressurized air from the second chamber thereby unlocking the brake actuator and unlocking the brakes, the electro mechanical means including a solenoid valve and a receiver decoder, said receiver-decoder being mounted in one of the pressurizable first and second chambers and being adapted for receiving the first, second, third and fourth coded signals and for controlling the solenoid valve in response to said signals, the solenoid valve being controlled by flow of electric current and wherein pressurized air is vented from the second chamber and entry of pressurized air into the second chamber is prevented in the absence of flow of current through the solenoid valve, the current being supplied from a power source, and wherein the apparatus further comprises switch and circuit means interposed between the power source and the solenoid valve and wherein the receiver decoder controls the switch and circuit means in response to the first, second, third and fourth signals, respectively, the switch and circuit means being adapted for:

(1) interrupting the flow of current in response to the first signal received by the receiver decoder;

(2) interrupting the flow of current in response to the third signal received by the receiver decoder;

(3) allowing the flow of current in response to the second signal, received by the receiver decoder, and (4) allowing the flow of current in response to the fourth signal received by the receiver decoder, the switch and circuit means including three separate switches, one of said switches being a proximity switch controlled by the position of the brake actuator and staying in a closed position when pressurized air is present in the second chamber, the other two switches being controlled by the receiver decoder.

26. An apparatus in accordance with claim 25 wherein the switch and circuit means include (1) a conducting line between the solenoid valve and the power source, said conducting line including one of said switches controlled by the receiver decoder in response to the first and second coded signals, the proximity switch being in line with said switch controlled by the receiver decoder in response to the first and second coded signals, (2) the switch and circuit means further including a second conducting line in parallel with the proximity switch and in line with the switch controlled by the receiver decoder in response to the first and second coded signals, said second conducting line including the second of the three switches, said second switch being controlled by the receiver decoder in response to the third and fourth coded signals.

27. A dual chamber brake system for locking and unlocking a brake actuator of a dual chamber brake system that operates brakes with compressed air to be used in trailers and vehicles, the brake system including the brake actuator in a first pressurizable chamber that serves as a service housing chamber and a high spring-rate spring in a second pressurizable chamber that serves as an emergency housing chamber, the brake actuator being movable in an axial direction to apply and release the brakes of the brake system; in the absence of compressed air the high spring-rate spring expanding to bias and keep the brake actuator in an axially forward position locking the brakes of the brake system, and wherein when there is compressed air in the second chamber the high spring-rate spring is compressed and allows retraction of the brake actuator from its forward position to unlock the brakes, the dual chamber brake system further comprising:

electro mechanical means mounted in one of the pressurizable service housing chamber and the pressurizable emergency housing chamber and being responsive to a first coded signal or to a third coded signal different from the first signal, for venting pressurized air from the second chamber and for preventing entry of pressurized air into the second chamber whereby expansion of the high spring rate spring causes the brake actuator to move into the axially forward position locking the brakes of the brake system, the electro mechanical means also being responsive to a second coded signal or to a fourth coded signal for allowing pressurized air to enter into the second chamber and for disallowing the venting of pressurized air from the second chamber thereby unlocking the brake actuator and unlocking the brakes, the electro mechanical means including a solenoid valve and a receiver decoder, said receiver-decoder being mounted in one of the pressurizable first and second chambers and being adapted for receiving the first, second, third and fourth coded signals and for controlling the solenoid valve in response to said signals, the solenoid valve being controlled by flow of electric current and wherein pressurized air is vented from the second chamber and entry of pressurized air into the second chamber is prevented in the absence of flow of current through the solenoid valve, the current being supplied from a power source, and wherein the apparatus further comprises switch and circuit means interposed between the power source and the solenoid valve and wherein the receiver decoder controls the switch and circuit means in response to the first, second, third and fourth signals, respectively, the switch and circuit means being adapted for:

(1) interrupting the flow of current in response to the first signal received by the receiver decoder;

(2) interrupting the flow of current in response to the third signal received by the receiver decoder;

(3) allowing the flow of current in response to the second signal, received by the receiver decoder, and (4) allowing the flow of current in response to the fourth signal received by the receiver decoder, the switch and circuit means including three separate switches, one of said switches being a proximity switch controlled by the position of the brake actuator and staying in a closed position when pressurized air is present in the second chamber, the other two switches being controlled by the receiver decoder.

* * * * *